Patented Sept. 12, 1933

1,926,618

UNITED STATES PATENT OFFICE 1,926,618

EXCHANGE SILICATE AND METHOD OF PREPARING

Harry Milton Gray, Los Angeles, Calif., assignor to H. W. Marks, Santa Barbara, Calif.

No Drawing. Application March 3, 1930
Serial No. 432,967

11 Claims. (Cl. 23—113)

This invention relates to the making of a material of the exchange silicate type and having the desired properties for the purpose of softening hard water to produce a softened water which is substantially neutral.

Insurance records show that 70 per cent of the boiler failures are due to the high alkalinity of zeolite softened water. The purpose of this invention, is to produce a synthetic rock which is different from all known zeolites, and one that will give a water free from alkali.

All water softening material, such as zeolites and like compounds, are made in a strongly alkaline, molten magma, or solution and for this reason, they produce softened water which is alkaline.

In the case of zeolite, the sodium contained in the zeolite is exchanged for the calcium and magnesium contained in the salts of the latter which are in the hard water. Thus calcium sulfate is transformed into sodium sulfate. Sodium is the only element in the zeolites which is exchanged. This transfer of sodium alone from the water softening material results in the softened water containing an excess of alkali.

I have found that by using a water softening material which contains both replaceable sodium and hydrogen that this difficulty can be overcome. In other words, by using a material which is capable of transforming calcium sulfate, for example, into sodium acid sulfate, the softened water will be substantially neutral and will remain so even when used in steam boilers.

I obtain such an exchange silicate by slowly adding a solution of sodium silicate to a solution containing an aluminum or other amphoteric metal sulphate, an acid and an oxidizing agent. Sufficient acid is used so that the mix will always remain acidic. This is of vital importance. The sodium silicate is added only in sufficient amount so that the silicate reaction product will contain not more than half the total sodium which it is capable of holding. Due to the mix being acidic and to the presence of the oxidizing agent, the reaction product will then contain replaceable hydrogen as well as replaceable sodium.

Ordinarily I employ sulfuric acid to maintain the acidity of the mix and use nitric acid for the oxidizing agent. Examples of metal salts which can be used, in place of aluminum sulphate, are the sulfates of iron, chromium, zinc, nickel, copper and silver. I do not, however, intend to be restricted to the ingredients specifically set forth but intend to include all other like acting substances which would occur to those skilled in the art.

The method just outlined produces a silicate gel. I prepare my final product from this by thoroughly washing the gel free of all water soluble substances which are present, pressing it into cakes and slowly drying it to produce a rock like non-porous material which may then be crushed and used for water softening purposes.

Among other advantages of my water softening material is the greater flow rate that can be obtained by its use.

The matter of making this compound in acid solution and in the presence of an oxidizing agent, and adding exactly enough soda, only, is therefore, the essence of this invention. To construct a compound that has the characteristics set forth I proceed in the following manner.

I take a 15 gallon jar or lead lined tank and pour therein 6 gallons of water; add one pound of aluminum or other amphoteric metallic sulphate which is soluble, stir well and add 3 fluid ounces of strong sulphuric acid, and one ounce of strong nitric acid. This is solution number 1.

Then I take one half gallon of silicate of soda, 40 deg. Baumé gravity and add to one and one half gallons of water and stir well. This is solution number 2.

Next, I add the two gallons of number 2 solution, to the number 1 solution in a fine stream with constant stirring and at a rate so that it will all be run together in two hours. It is important that the mixing is slow enough so that at all times the mix will be acidic, for if this condition is not maintained, the batch will become spoiled.

The entire contents of the jar at once sets to a jelly like mass; after standing 2 hours I add 5 gallons of water and stir to break the jelly up into small pieces or into a kind of batter and let stand for 6 hours.

Then I pour or siphon off the clear liquid down to the jelly and fill up with water again; stir and let stand for 6 hours.

I again pour or siphon off the clear liquid down to the jelly and fill up with water, stir and let stand for 6 hours;

After this third washing, which removes all soluble matter the jelly like mass is dipped out or drawn off from the bottom into moulds and pressed for 3 hours to bricks or slabs. These are handled with great care, so as not to disturb the jelly formation, and set away to dry, at a temperature not to exceed 130 degrees Fahrenheit, for 2 to 3 months.

During this time the water of colloidal solution evaporates, and also the water of combination, causing an atomic rearrangement and the slabs will be found to have shrunken in size and set to a hard glass like body or rock. These are crushed and screened to suitable size and are ready for use.

To use this material, it is placed in a tank or suitable container and the water to be softened, is allowed to pass through, flowing in contact with the crystals.

Now therefore, having fully described my invention, what I claim as new, and desire to secure by Letters Patent is:—

1. The process of preparing a water softening material of the exchange silicate type, which consists in dissolving aluminum sulfate in water containing sulfuric acid and nitric acid, slowly adding to the mixture a solution of sodium silicate in the proportion of 6 pounds of 40° Bé. sodium silicate to each pound of aluminum sulfate, maintaining an acidic mix during said step, allowing a gel to form, thoroughly washing said gel to remove all water soluble substances therefrom, pressing the gel into cakes without disturbing the gel structure, and drying for a period of months at a temperature below 130° F. to produce a hard close-grained non-porous product.

2. The process of preparing a water softening material of the exchange silicate type, which consists in dissolving an aluminum salt in water containing sulfuric acid and nitric acid, slowly adding to the mixture a solution of sodium silicate in amount insufficient to produce a silicate reaction product having more than half the possible sodium content, maintaining an acidic mix during said step, allowing a gel to form, thoroughly washing said gel to remove all water soluble substances therefrom, pressing the gel into cakes without disturbing the gel structure, and slowly drying at a temperature below 130° F. to produce a hard close-grained non-porous product.

3. The process of preparing a water softening material of the exchange silicate type, comprising the steps of dissolving in water containing sulfuric acid and nitric acid a salt of a metal selected from the class consisting of aluminum, iron, chromium, zinc, nickel, copper and silver, slowly adding to the mixture a solution of sodium silicate in amount insufficient to produce a silicate reaction product having more than half the possible sodium content, maintaining an acidic mix during said step, allowing a gel to form, thoroughly washing said gel to remove all water soluble substances therefrom, pressing the gel into cakes without disturbing the gel structure, and slowly drying to produce a hard close-grained non-porous product.

4. The process of preparing a water softening material of the exchange silicate type, comprising the steps of dissolving an amphoteric-metal salt in water containing sulfuric acid and nitric acid, slowly adding to the mixture a solution of sodium silicate in amount insufficient to produce a silicate reaction product having more than half the possible sodium content, maintaining an acidic mix during said step, allowing a gel to form, thoroughly washing the gel to remove all water soluble substances therefrom, pressing the gel into cakes without disturbing the gel structure, and slowly drying to produce a hard close-grained non-porous product.

5. In the process for preparing water softening material of the exchange silicate type, the steps comprising reacting a solution of sodium silicate with an acidic solution of a water soluble amphoteric-metal sulfate in the presence of an oxidizing agent typified by nitric acid, the proportions being adjusted so as to maintain an acidic mix and so as to produce a silicate gel reaction product having not more than half the possible sodium content, washing the gel to remove water soluble substances therefrom, pressing the gel into cakes and slowly drying.

6. In the process for preparing water softening material of the exchange silicate type, the step of reacting a solution of sodium silicate with an acidic solution of a water soluble amphoteric-metal salt in the presence of an oxidizing agent typified by nitric acid, the proportions being adjusted so as to maintain an acidic mix and so as to produce a silicate gel reaction product having not more than half the possible sodium content.

7. A water softening material of the exchange silicate type having a hard close-grained non-porous structure and having the property of converting calcium sulfate into sodium acid sulfate when brought in contact with a solution of the former.

8. A water softening material of the exchange silicate type having the property of converting calcium sulfate into sodium acid sulfate when brought in contact with a solution of the former.

9. A complex sodium hydrogen aluminum silicate for use in water softening and having the property of simultaneously exchanging a sodium and a hydrogen atom for a magnesium or calcium atom.

10. A water softening material of the exchange silicate type characterized by having an equal number of replaceable sodium and hydrogen atoms, whereby water softened by it will not be rendered alkaline.

11. A water softening material of the exchange silicate type characterized by having an equal number of replaceable sodium and hydrogen atoms, by having a hard close-grained non-porous structure, and by being capable of softening water so that the water will not be alkaline nor become alkaline when used in steam boilers.

HARRY MILTON GRAY.